United States Patent
Li

(10) Patent No.: US 12,508,871 B2
(45) Date of Patent: Dec. 30, 2025

(54) REFRIGERANT-COOLANT HEAT PUMP SYSTEM OF ELECTRIC VEHICLES

(71) Applicant: FCA US LLC, Auburn Hills, MI (US)

(72) Inventor: Meng Li, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 182 days.

(21) Appl. No.: 18/456,954

(22) Filed: Aug. 28, 2023

(65) Prior Publication Data

US 2025/0074147 A1 Mar. 6, 2025

(51) Int. Cl.
*B60H 1/00* (2006.01)

(52) U.S. Cl.
CPC ..... *B60H 1/00885* (2013.01); *B60H 1/00278* (2013.01); *B60H 1/00392* (2013.01); *B60H 2001/00307* (2013.01); *B60H 2001/00928* (2013.01)

(58) Field of Classification Search
CPC ............ B60H 1/00885; B60H 1/00278; B60H 1/00392; B60H 1/00899; B60H 2001/00307; B60H 2001/00928
See application file for complete search history.

(56) References Cited

U.S. PATENT DOCUMENTS

| | | | |
|---|---|---|---|
| 7,789,176 B2 | 9/2010 | Zhou | |
| 7,841,431 B2 | 11/2010 | Zhou | |
| 8,448,696 B2 | 5/2013 | Johnston et al. | |
| 2018/0354343 A1* | 12/2018 | Suzuki | B60H 1/00921 |
| 2020/0047591 A1* | 2/2020 | He | B60H 1/32284 |
| 2021/0387506 A1* | 12/2021 | Miyoshi | B60H 1/32284 |
| 2024/0399819 A1* | 12/2024 | Enokijima | F25B 1/00 |

* cited by examiner

*Primary Examiner* — Marc E Norman
(74) *Attorney, Agent, or Firm* — Jeremy J. Klobucar

(57) ABSTRACT

A heat pump system includes a refrigerant loop and a coolant loop. The refrigerant loop includes a compressor, a water condenser, an expansion valve, and a chiller. The coolant loop includes two water pumps, a one-way valve, six three-way valves, a cabin cooler, a cabin heater, a battery pack, and an electric drive system. An electric heater is used to generate additional heat power for cabin heating. A fan and a blower are used to control the front end and cabin airflow. The heat pump system provides a simplified thermal design for electric vehicles while providing efficient thermal management of the cabin and the powertrain system.

5 Claims, 4 Drawing Sheets

REFRIGERANT-COOLANT HEAT PUMP SYSTEM OF ELECTRIC VEHICLES

FIELD

The present invention relates to electric vehicles and, more particularly, to a thermal management heat pump system of an electric vehicle.

BACKGROUND

As an important part of electric vehicles, a thermal management system works to provide thermal protection of the powertrain system, such as the battery and electric motor, while also providing thermal comfort for drivers and passengers with functionalities of heating, cooling, and dehumidification. Compared with traditional thermal management systems having a heating, ventilation and air conditioning system that use solely electric heaters for cabin heating in electric vehicles, the improved thermal management system of the present disclosure also utilizes a heat pump system, which has shown advantages of reducing the energy consumption by absorbing energy from multiple sources, including the ambient environment and waste heat of powertrain components.

Known prior art thermal management systems have drawbacks associated with electric heaters as well as the utilization of a multiple fluid loop design for the subsystem, especially the refrigerant loop, which results in higher cost and maintenance difficulties. Therefore, it is desirable to develop an efficient heat pump system of a thermal management system by simplifying the thermal architecture and reducing the number of thermal management components.

SUMMARY

To achieve the above objective, the present disclosure presents a thermal management system having a heat pump system for electric vehicles. The heat pump system includes a refrigerant loop and a coolant loop and a control module. The refrigerant loop includes a compressor, a water condenser, an expansion valve, and a chiller. The coolant loop includes two water pumps, a one-way valve, six three-way valves, a cabin cooler, a cabin heater, a battery pack, and an electric drive module. An electric heater is used to generate additional heat power for cabin heating. A fan and a blower are used to control the front end and cabin airflow.

According to an aspect of the present disclosure, the control module is in signal communication with the following components, including: the compressor, the expansion valve, the first water pump, the second water pump, the one-way valve, the first three-way valve, the second three-way valve, the third three-way valve, the fourth three-way valve, the fifth three-way valve, the sixth three-way valve, the electric heater, the fan, and the blower. The control module controls the refrigerant flow by controlling the compressor speed and the opening of the expansion valve; the control module controls the coolant flow by controlling the speed of the first water pump and the second water pump, the opening of the one-way valve, the opening of six three-way valves; the control module controls the air flow by controlling the speed of the fan and the blower; the control module controls the heating power by controlling the electric heater current; the control module. The control logic of the thermal management system is simple and clear, which is easy to implement.

According to an aspect of the present disclosure, the heat pump system under a heat pump mode uses the ambient environment or the electric drive system as the heat source to heat the battery at low ambient temperatures, which reduces the internal resistance and alleviates the aging issue of the battery system at cold conditions.

According to an aspect of the present disclosure, the heat pump system under the heat pump mode uses the ambient environment or the electric drive system as the heat source to heat the cabin at low temperatures, which provides cabin thermal comfort.

According to an aspect of the present disclosure, the heat pump system reduces the humidity of the cabin air with the evaporator, and the coolant heater is used to maintain appropriate cabin temperature. This working mode is used for windshield defogging or defrosting.

According to an aspect of the present disclosure, the heat pump system cools the cabin with the cabin cooler and cools the battery with the chiller at high ambient temperatures, and the electric drive system is cooled with the radiator.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

Figure 1:
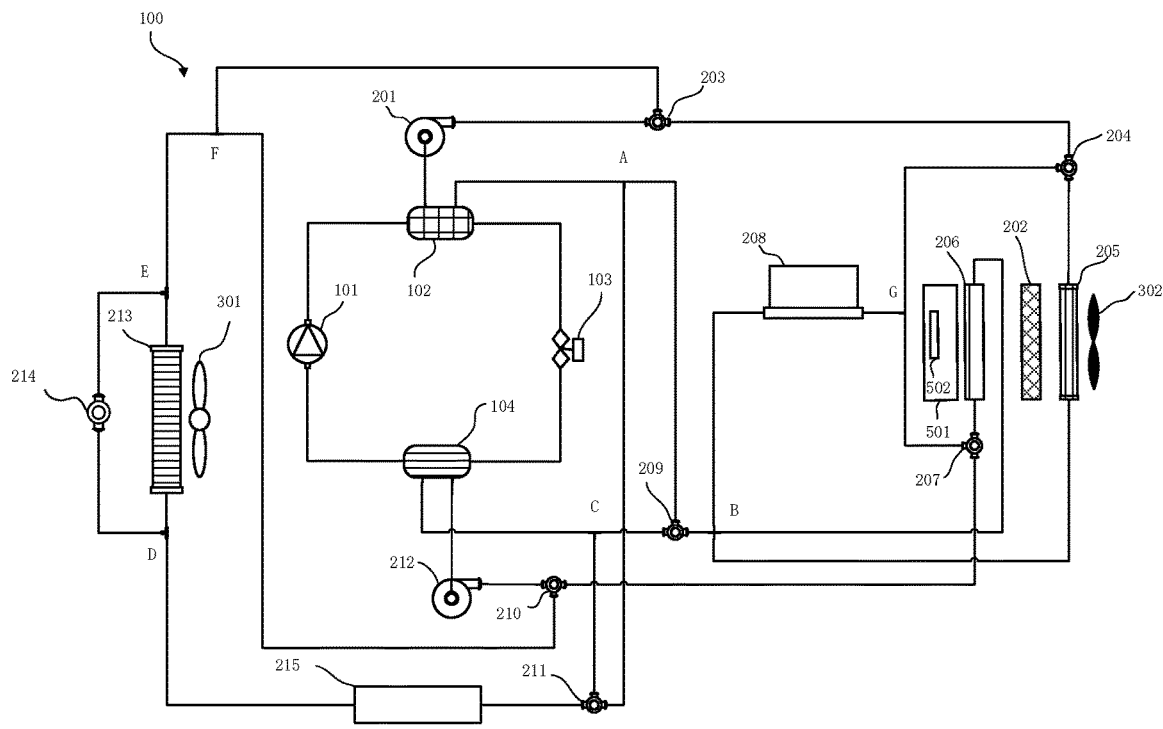
FIG. 1 is an example system diagram of an example heat pump system according to an embodiment of the present application.

FIG. 1 is an example system schematic of a heat pump system 100 by illustrating various components and their associated connections. The heat pump system 100 includes a compressor 101, a water condenser 102, an expansion valve 103, a chiller 104, a first water pump 201, an electric heater 202, a first three-way valve 203, a second three-way valve 204, a cabin heater 205, a cabin cooler 206, a third three-way valve 207, a battery pack 208, a fourth three-way valve 209, a fifth three-way valve 210, a sixth three-way valve 211, a second water pump 212, a radiator 213, a one-way valve 214, an electric drive system 215, a fan 301, and a blower 302.

The selection and function of each component of the heat pump system 100 are described as follows. The compressor 101 adopts a scroll type or other types of electric compressors, and its function is to compress the refrigerant into superheated steam and push it to flow in the refrigerant circulation system or subsystem. The water condenser 102 and the chiller 104 are a coolant-refrigerant heat exchanger, which provides heat exchange between the coolant and the refrigerant. The expansion valve 103 can be an electromagnetic expansion valve or electronic expansion valve, and the temperature accuracy of the degree of superheat or the degree of subcooling can be achieved by controlling an opening of its valve holes. The first water pump 201 and the second water pump 212 are electric water pumps, which push the coolant to flow in the coolant loop system or subsystem. The cabin heater 205, the cabin cooler 206, and the radiator 213 are coolant-air heat exchangers, which provide heat exchange between air and coolant. The electric heater 202 can be a positive temperature coefficient heater or other types of air heaters to convert electric power into the heating power. The fan 301 is an electric fan and provides the required air flow for the heat exchange between the coolant and the air in the radiator 213. The blower 302 is an electric blower to provide the required air flow for cabin 501 thermal management.

Figure 2:
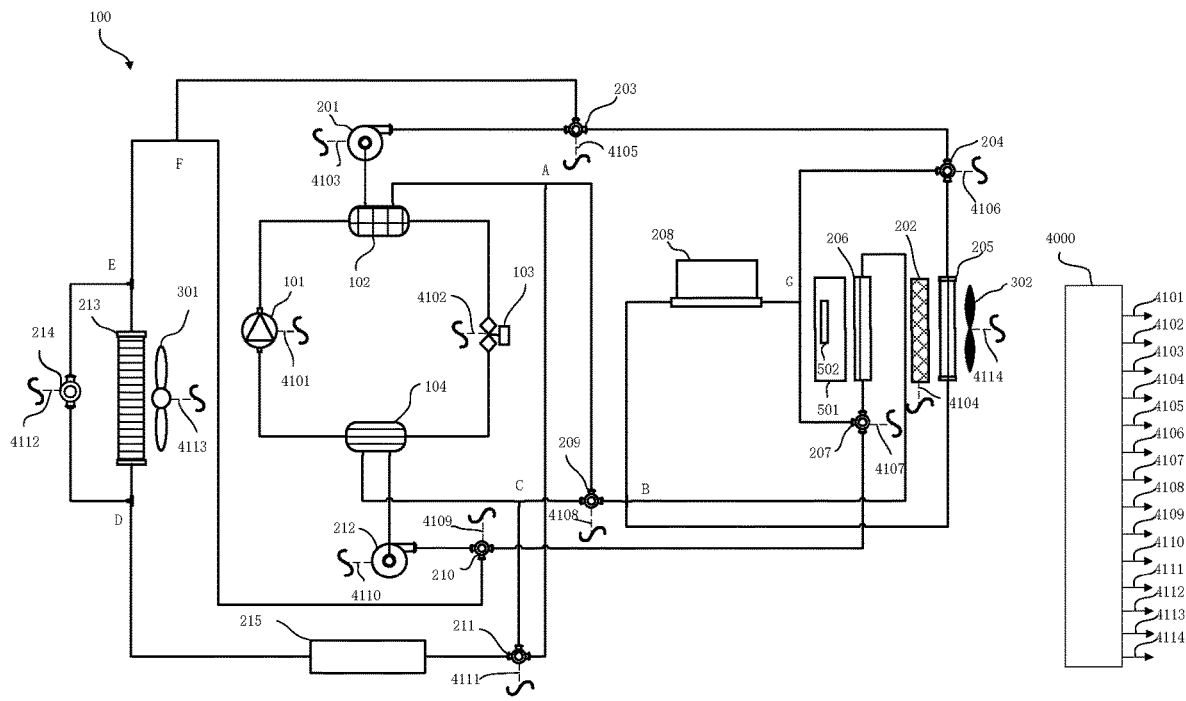
FIG. 2 is an example schematic diagram of a communication connection between a control module in FIG. 1 and each actuator of the heat pump system according to an embodiment of the present application.

FIG. 2 shows signal communication between a control module 4000 and each actuator of the heat pump system 100. The control module 4000 determines a working status of each actuator of the heat pump system 100. The control module 4000 output signals, 4101, 4102, 4103, 4104, 4105, 4106, 4107, 4108, 4109, 4110, 4111, 4112, 4113, and 4114 are respectively connected to the compressor 101, the expansion valve 103, the first water pump 201, the electric heater 202, the first three-way valve 203, the second three-way valve 204, the third three-way valve 207, the fourth three-way valve 209, the fifth three-way valve 210, the second water pump 212, the sixth three-way valve 211, the one-way valve 214, the fan 301, and the blower 302.

Figure 3:
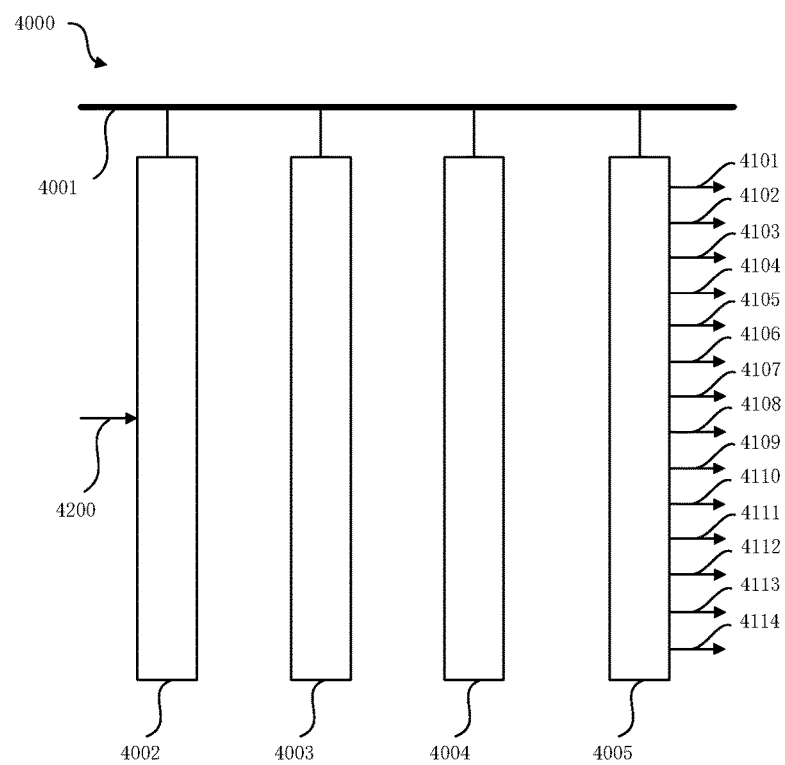
FIG. 3 is an example schematic internal structure diagram of the control module shown in FIG. 2 according to an embodiment of the present application.

FIG. 3 illustrates an example of an internal structure of the control module 4000 shown in FIG. 2. The control module 4000 of the heat pump system 100 includes a can bus 4001, an input interface 4002, a memory 4003, a processor 4004 and an output interface 4005. Specifically, the input interface 4002 receives an operation request 4200; the memory 4003 is used to store instructions and data; the processor 4004 reads instructions and data from the memory 4003 and can write data to the memory 4003; the output interface 4005 sends control signals to each actuator.

FIG. 4-7 are example system diagrams of operation of the heat pump system 100 shown in FIG. 1 to illustrate various fluid flow states of the heat pump system 100 in different operating modes. The hollow line arrows indicate active refrigerant flow, and the bold solid arrow indicates active coolant flow, and other lines indicate no fluid flow. Each working mode will be described in detail as set forth below.

In one example implementation, the heat pump system 100 includes a refrigerant circulation system or subsystem and a coolant circulation system or subsystem. The refrigerant circulation subsystem includes, in one exemplary implementation, the compressor 101, water condenser 102, expansion valve 103 and chiller 104 in refrigerant fluid communication with each outer via one or more fluid connecting passages. In one example implementation, the refrigerant circulation subsystem is a simplified system consisting only of the compressor 101, water condenser 102, expansion valve 103 and chiller 104. In this example implementation, the refrigerant circulation subsystem is a closed flow system in refrigerant communication with only the aforementioned components and is in indirect heat exchange communication with the coolant circulation subsystem via only the chiller and water condenser.

The coolant circulation subsystem includes, in one example implementation, the first water pump 201, the first three-way valve 203, the second three-way valve 204, the cabin heater 205, the cabin cooler 206, the third three-way valve 207, the fourth three-way valve 209, the fifth three-way valve 210, the sixth three-way valve 211, the second water pump 212, the radiator 213, and the one-way valve 214. where one or more of these components can be placed in selective coolant communication with each other via fluid passages and control of the various valves and pumps.

The coolant circulation subsystem is also in coolant fluid communication and/or selective coolant fluid communication with the water condenser 102 (indirect heat exchange communication), chiller 104 (indirect heat exchange communication), battery pack 208, and/or the electric drive system 215. The fan 301 is utilized for air-coolant heat exchange with the radiator 213, and the blower 302 is utilized for air-coolant heat exchange with the cabin heater 205.

Figure 4:
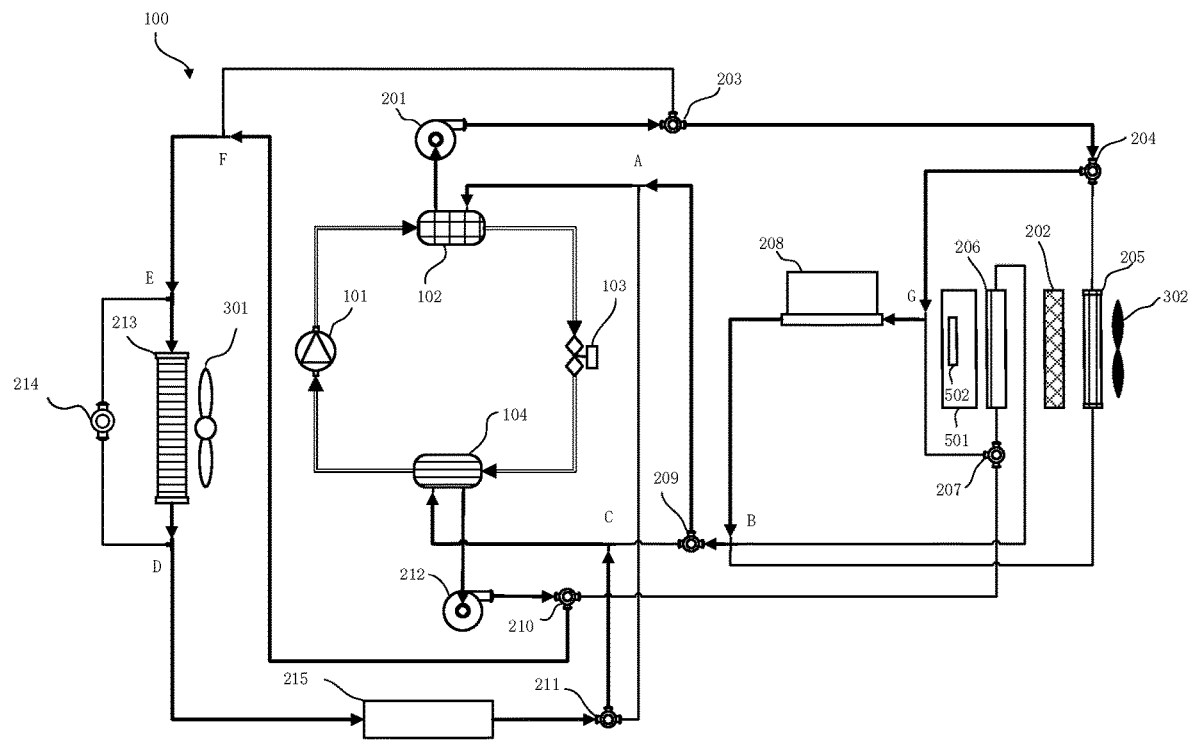
FIG. 4 is an example operating schematic of the heat pump system shown in FIG. 1 under a mode of battery heating with the heat pump system according to an embodiment of the present application.

FIG. 4 shows an example of battery heating with the heat pump system 100. At low temperatures, the battery pack 208 needs to be warmed up for normal function and extension of use life. The high-temperature and high-pressure refrigerant flowing out from the compressor 101 passes through the refrigerant channel of the water condenser 102 and is condensed from the gaseous state to the liquid state under the cooling effect of the cooling liquid. The high-temperature and high-pressure refrigerant will decompress and increase in volume through the partially opened expansion valve 103, forming a low-temperature and low-pressure liquid mist and entering the chiller 104, which absorbs a large amount of heat in the coolant.

In this mode, the control module 4000 controls the first, second, third and fourth three-way valves 203, 204, 208, 208 to form a first coolant flow subloop in coolant fluid communication with the first water pump 201, water condenser 102, and the battery pack 208 while bypassing the cabin heater and cooler 205, 206, the chiller 104, the radiator 213 and the electric drive system 215. The control module 4000 also controls the fifth and sixth three-way valves 210, 211 in connection with controlling the first, second, third and fourth three-way valves 203, 204, 208, 208 (in the manner mentioned above) to form a second coolant flow subloop in coolant fluid communication with the second water pump 212, the chiller 104, the radiator 213 and the electric drive system 215 while also bypassing the cabin heater and cooler 205, 206 and the first coolant flow subloop. In this exemplary implementation coolant flow in the first and second subloops are separate and distinct from one another.

The first water pump 201 will suck the heated coolant from the outlet of the water condenser 102 and pump the coolant to flow through the first coolant subloop, which includes through the first three-way valve 203, the second three-way valve 204, and the pipeline junction G to reach the battery pack 208 coolant channel, where the high-temperature coolant can heat the battery pack 208 through heat convection. The coolant exiting the battery pack 208 coolant channel will pass through the pipeline junction B, the fourth three-way valve 209, the pipeline junction A to enter the water condenser 102 as a complete coolant circulation.

The second water pump 212 will suck the cooled coolant from the outlet of the chiller 104 and pump the coolant through the second coolant flow subloop to flow through the fifth three-way valve 210, the pipeline junction F and E to enter the radiator 213, where the low-temperature coolant will absorb heat from the ambient environment. The coolant exiting the radiator 213 will pass through the pipeline junction D, the electric drive system 215, the sixth three-way valve 211, and the pipeline junction C to return to the chiller 104. It is noteworthy that the electric drive system 215 can provide additional heat to the coolant for heat recovery. If the ambient temperature is very low and heat extraction from the environment is not feasible, the one-way valve 214 can be opened to bypass the radiator. In this case, only the heat generated by the electric drive system 215 is used.

Figure 5:
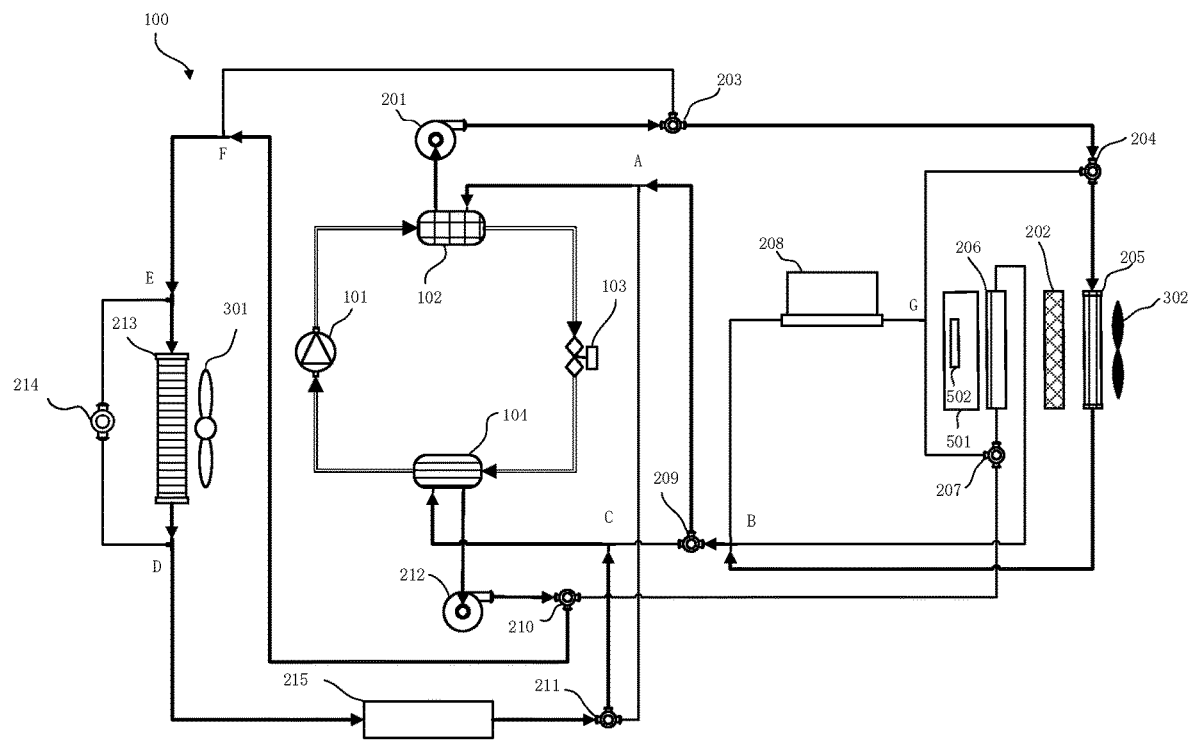
FIG. 5 is an example operating schematic of the heat pump system shown in FIG. 1 under a mode of cabin heating with the heat pump system according to an embodiment of the present application.

FIG. 5 shows cabin heating with the heat pump system 100. At low ambient temperatures, cabin heating is typically needed for appropriate thermal comfort of a driver and passengers. The refrigerant circulation works in the same way as shown in FIG. 4. In this mode, the control module 4000 controls the first, second, third and fourth three-way valves 203, 204, 208, 208 to form a first (for this mode) or third coolant flow subloop in coolant fluid communication with the first water pump 201, water condenser 102, and the cabin heater 205 while bypassing the cabin cooler 206, the battery pack 208, chiller 104, the radiator 213 and the electric drive system 215. The control module 4000 also controls the fifth and sixth three-way valves 210, 211 in connection with controlling the first, second, third and fourth three-way valves 203, 204, 208, 208 (in the manner mentioned above) to form a second (for this mode) or fourth coolant flow subloop in coolant fluid communication with the second water pump 212, the chiller 104, the radiator 213 and the electric drive system 215 while also bypassing the cabin cooler 206 and the battery pack 208 and the first/third coolant flow subloop including the components in fluid communication therewith. In this exemplary implementation coolant flow in the first and second subloops are separate and distinct from one another.

The first water pump 201 will suck the heated coolant from the outlet of the water condenser 102 and pump the coolant to flow through the first three-way valve 203 and the second three-way valve 204 to reach the cabin heater 205, where the blower 302 will provide the airflow to extract the heat from the coolant in the cabin heater 205 to heat the cabin 501. The coolant exiting the cabin heater 205 will pass through the pipeline junction B, the fourth three-way valve 209, the pipeline junction A to enter the water condenser 102 as a complete coolant circulation. The coolant flow to extract heat from the ambient environment or the electric drive system 215 is the same as shown in FIG. 4.

Figure 6:
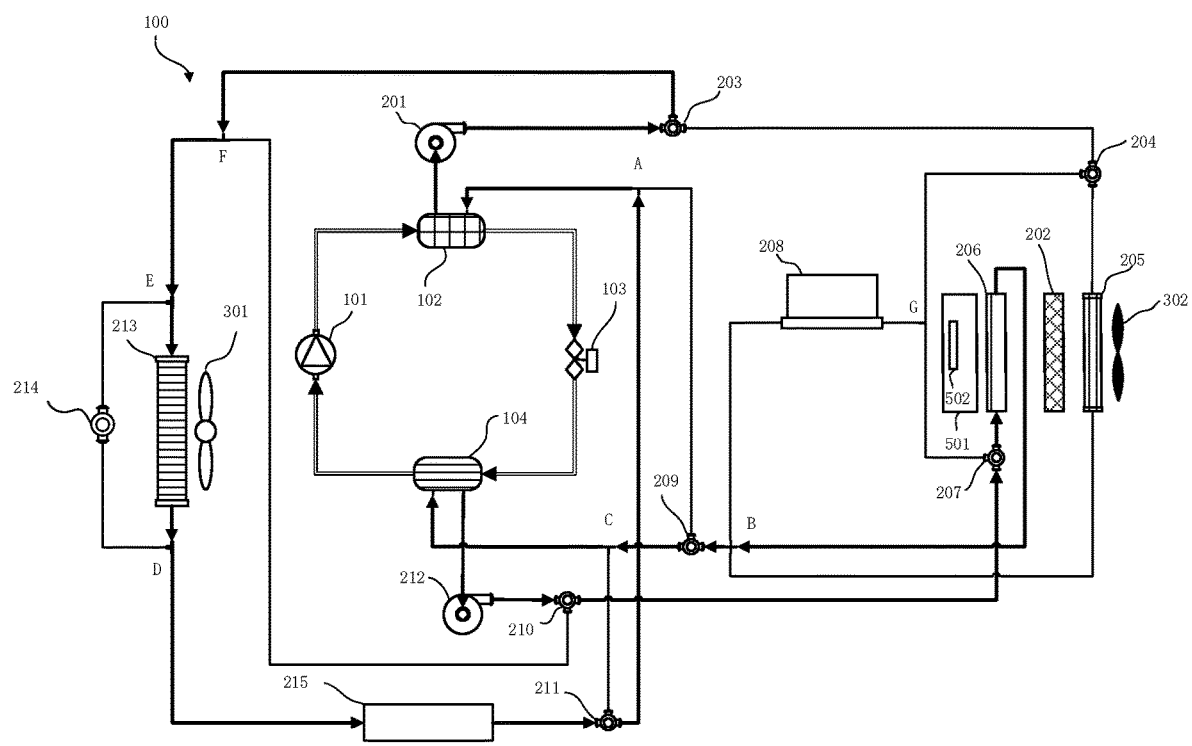
FIG. 6 is an example operating schematic of the heat pump system shown in FIG. 1 under a mode of windshield dehumidification according to an embodiment of the present application.

FIG. 6 shows windshield 502 defogging or defrosting with the heat pump system 100. When the heat pump system 100 receives a command to defrost or defog the windshield 502, it needs to lower the air humidity through the cabin cooler 206 and raise the cabin 501 air temperature through the electric heater 202. The refrigerant circulation works in the same way as shown in FIG. 4. In this mode, the control module 4000 controls the first and sixth three-way valves 203 and 211 to form a first (for this mode) or fifth coolant flow subloop in coolant fluid communication with the first water pump 201, water condenser 102, radiator 213 and electric drive system 215 while bypassing the cabin heater and cooler 205, 206, the chiller 104, and the battery pack 208. The control module 4000 also controls the third, fourth and fifth three-way valves 207, 209, 210 in connection with controlling the first and sixth three-way valves 203 and 211 (in the manner mentioned above) to form a second (for this mode) or sixth coolant flow subloop in coolant fluid communication with the second water pump 212, the chiller 104, the radiator 213 and the cabin heater 206 while also bypassing the cabin cooler 205, the battery pack 208 and the first/fifth coolant flow subloop including the components in fluid communication therewith. In this exemplary implementation coolant flow in the first and second subloops are separate and distinct from one another.

The first water pump 201 will suck the heated coolant from the outlet of the water condenser 102 and pump the coolant to flow through the first three-way valve 203, the pipeline junction F and E to enter the radiator 213, where the high-temperature coolant will reject heat to the ambient environment. The coolant exiting the radiator 213 will pass through the pipeline junction D, the electric drive system 215, the sixth three-way valve 211, and the pipeline junction A to return to the water condenser 102.

The second water pump 212 will suck the cooled coolant from the outlet of the chiller 104 and pump the low-temperature coolant to flow through the fifth three-way valve 210, the third three-way valve 207 to enter the cabin cooler 206, where the blower 302 will provide the airflow of low temperature to reduce the cabin 501 humidity for windshield 502 defrosting or defogging. The electric heater 202 can be used to provide additional heat to adjust the cabin 501 air temperature.

Figure 7:
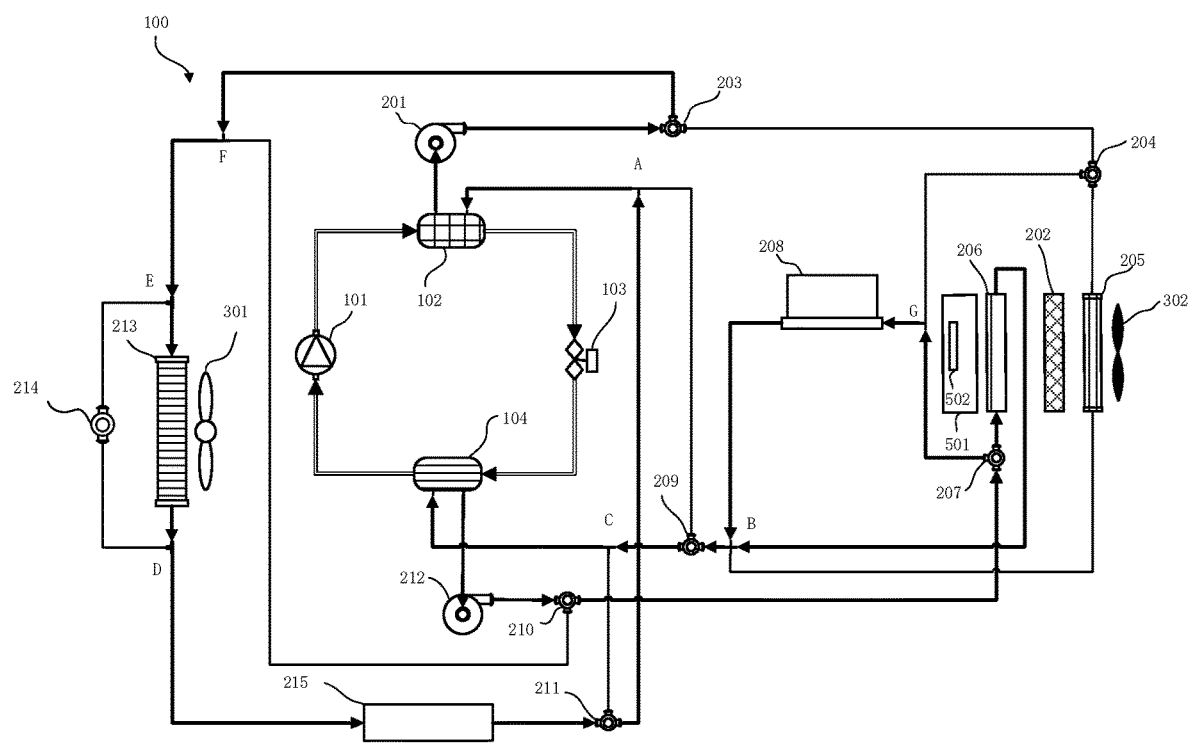
FIG. 7 is an example operating schematic of the heat pump system shown in FIG. 1 under a mode of cabin and battery cooling with the heat pump system and cooling of the electric drive system with a radiator according to an embodiment of the present application.

FIG. 7 shows cabin 501 cooling with the heat pump system 100 and cooling of the battery 302 and the electric drive system 215 with the radiator 306 in the heat pump system 100. The refrigerant circulation works in the same way as shown in FIG. 4. The coolant flow to reject heat to the ambient environment is the same as shown in FIG. 6, and the low-temperature coolant exiting the radiator 213 will cool the electric drive system 215.

In this mode, the control module 4000 controls the first and sixth three-way valves 203 and 211 to form a first (for this mode) or seventh coolant flow subloop in coolant fluid communication with the first water pump 201, water condenser 102, radiator 213 and electric drive system 215 while bypassing the cabin heater and cooler 205, 206, the chiller 104, and the battery pack 208. The control module 4000 also controls the second, third, fourth and fifth three-way valves 204, 207, 209, 210 in connection with controlling the first and sixth three-way valves 203 and 211 (in the manner mentioned above) to form a second (for this mode) or eighth coolant flow subloop in coolant fluid communication with the second water pump 212, the chiller 104, the cabin heater 206 and the battery pack 208, while also bypassing the cabin cooler 205, and the first/seventh coolant flow subloop including the components in fluid communication therewith. In this exemplary implementation coolant flow in the first and second subloops are separate and distinct from one another.

The second water pump 212 will suck the cooled coolant from the outlet of the chiller 104 and pump the low-temperature coolant to flow through the fifth three-way valve 210 to be split into two flow branches at the third three-way valve 207: the coolant of the first branch will enter the cabin cooler 206 for cabin 501 cooling, and the coolant of the second branch will pass through the pipeline junction G to enter the cooling channel of the battery pack 208 for battery cooling. The coolant will converge at the pipeline junction B and then pass through the fourth three-way valve 209 and the pipeline junction C to return to the chiller 104.

As used herein, the terms "comprise", "comprising", "includes", "including", "has", "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle thermal management system having a heat pump system, the heat pump system comprising:
   a refrigerant loop including a compressor, a water condenser, an expansion valve, and a chiller in refrigerant fluid communication with each other;
   a coolant loop including first and second water pumps, a one-way valve, first, second, third, fourth, fifth and sixth three-way valves, a cabin cooler, a cabin heater, a radiator, a battery pack, and an electric drive system in coolant fluid communication or selective coolant fluid communication with each other during one or more operating modes of the heat pump system;
   an electric fan for providing airflow relative to the radiator and a blower for providing airflow relative to the cabin heater, an electric heater and/or the cabin cooler, wherein the electric heater is selectively controlled to generate additional heat power for vehicle cabin heating; and
   a control module in signal communication with the compressor, the expansion valve, the first water pump, the second water pump, the one-way valve, the first, second, third, fourth, fifth and sixth three-way valves, the electric heater, the fan, and the blower;
   wherein the control module:
   is configured to control the heat pump system to use ambient air and/or the electric drive system as a heat source to heat the battery pack; and
   controls the first, second, third and fourth three-way valves to form a first coolant flow subloop in coolant fluid communication with the first water pump, water condenser and battery pack while bypassing the cabin heater, cabin cooler, chiller, radiator and electric drive system;
   controls the fifth and sixth three-way valves to form a second coolant flow subloop in coolant fluid communication with the second water pump, chiller, radiator and the electric drive system while also bypassing the cabin heater, cabin cooler and the first coolant flow subloop;
   controls the compressor to pump refrigerant though the refrigerant loop resulting in i) the refrigerant being cooled by the water condenser thereby rejecting heat to the coolant flowing therethrough from the first coolant flow subloop and forming high-temperature coolant, and ii) the refrigerant absorbing heat from the coolant flowing from the second coolant flow subloop through the chiller thereby heating the refrigerant for subsequent use with the water condenser;
   controls the first water pump to flow coolant in the first coolant flow subloop through the water condenser to heat the coolant thereby forming the high-temperature coolant, which then flows through the battery pack to heat the battery pack; and
   controls the second water pump to flow coolant in the second coolant flow subloop exiting the chiller through the radiator to absorb heat from the ambient environment to form high-temperature coolant and through the chiller to heat the refrigerant temperature for the subsequent use with the water condenser.

2. The heat pump system of claim 1, wherein when the coolant flowing though the radiator does not absorb heat from the ambient environment, the control module is configured to open the one-way valve to have coolant flow bypass the radiator and extract heat from the electric drive system as the coolant flows therethrough.

3. A vehicle thermal management system having a heat pump system, the heat pump system comprising:
a refrigerant loop including a compressor, a water condenser, an expansion valve, and a chiller in refrigerant fluid communication with each other;
a coolant loop including first and second water pumps, a one-way valve, first, second, third, fourth, fifth and sixth three-way valves, a cabin cooler, a cabin heater, a radiator, a battery pack, and an electric drive system in coolant fluid communication or selective coolant fluid communication with each other during one or more operating modes of the heat pump system;
an electric fan for providing airflow relative to the radiator and a blower for providing airflow relative to the cabin heater, an electric heater and/or the cabin cooler, wherein the electric heater is selectively controlled to generate additional heat power for vehicle cabin heating; and
a control module in signal communication with the compressor, the expansion valve, the first water pump, the second water pump, the one-way valve, the first, second, third, fourth, fifth and sixth three-way valves, the electric heater, the fan, and the blower;
wherein the control module:
is configured to control the heat pump system to use ambient air and/or the electric drive system as a heat source to heat the vehicle cabin;
controls the first, second, third and fourth three-way valves to form a first coolant flow subloop in coolant fluid communication with the first water pump, water condenser and cabin heater while bypassing the battery pack, cabin cooler, chiller, radiator and electric drive system;
controls the fifth and sixth three-way valves to form a second coolant flow subloop in coolant fluid communication with the second water pump, chiller, radiator and the electric drive system while also bypassing the cabin cooler, battery pack and the first coolant flow subloop;
controls the compressor to pump refrigerant though the refrigerant loop resulting in i) the refrigerant being cooled by the water condenser thereby rejecting heat to the coolant flowing therethrough from the first coolant flow subloop and forming high-temperature coolant, and ii) the refrigerant absorbing heat from the coolant flowing from the second coolant flow subloop through the chiller thereby heating the refrigerant for subsequent use with the water condenser;
controls the first water pump to flow coolant in the first coolant flow subloop through the water condenser to heat the coolant thereby forming the high-temperature coolant, which then flows through the cabin heater to heat the vehicle cabin; and
controls the second water pump to flow coolant in the second coolant flow subloop exiting the chiller through the radiator to absorb heat from the ambient environment to form high-temperature coolant and then through the chiller to heat the refrigerant temperature for the subsequent use with the water condenser.

4. A vehicle thermal management system having a heat pump system, the heat pump system comprising:
a refrigerant loop including a compressor, a water condenser, an expansion valve, and a chiller in refrigerant fluid communication with each other;
a coolant loop including first and second water pumps, a one-way valve, first, second, third, fourth, fifth and sixth three-way valves, a cabin cooler, a cabin heater, a radiator, a battery pack, and an electric drive system in coolant fluid communication or selective coolant fluid communication with each other during one or more operating modes of the heat pump system;
an electric fan for providing airflow relative to the radiator and a blower for providing airflow relative to the cabin heater, an electric heater and/or the cabin cooler, wherein the electric heater is selectively controlled to generate additional heat power for vehicle cabin heating; and
a control module in signal communication with the compressor, the expansion valve, the first water pump, the second water pump, the one-way valve, the first, second, third, fourth, fifth and sixth three-way valves, the electric heater, the fan, and the blower;
wherein the control module is configured to control the heat pump system to cool the vehicle cabin and the battery pack by the chiller, and cool the electric drive system by the radiator.

5. The heat pump system of claim 4, wherein the control module:
controls the first and sixth three-way valves to form a first coolant flow subloop in coolant fluid communication with the first water pump, water condenser radiator and electric drive system while bypassing the cabin heater, cabin cooler, chiller, and battery pack;
controls the second, third, fourth and fifth three-way valves to form a second coolant flow subloop in coolant fluid communication with the second water pump, chiller, battery pack and cabin cooler while bypassing the cabin heater and the first coolant flow subloop;
controls the compressor to pump refrigerant though the refrigerant loop resulting in i) the refrigerant being cooled by the water condenser thereby rejecting heat to the coolant flowing therethrough from the first coolant flow subloop and forming high-temperature coolant exiting the water condenser, and ii) the refrigerant absorbing heat from the coolant flowing from the second coolant flow subloop through the chiller thereby heating the refrigerant for subsequent use with the water condenser and forming low-temperature coolant exiting the chiller;
controls the first water pump to flow coolant in the first coolant flow subloop through the water condenser to heat the coolant thereby forming the high-temperature coolant exiting the water condenser, which then flows through the radiator where the high temperature coolant will reject heat to the atmosphere resulting in the low-temperature coolant flowing through the electric drive system to cool the electric drive system and then back to the water condenser; and
controls the second water pump in the second coolant flow subloop to flow the low-temperature coolant exiting the chiller through i) the cabin cooler where the fan is controlled to provide airflow through the cabin cooler to provide airflow to the vehicle cabin to cool the vehicle cabin, and ii) through the battery pack to cool the battery pack.

* * * * *